Patented Sept. 7, 1954

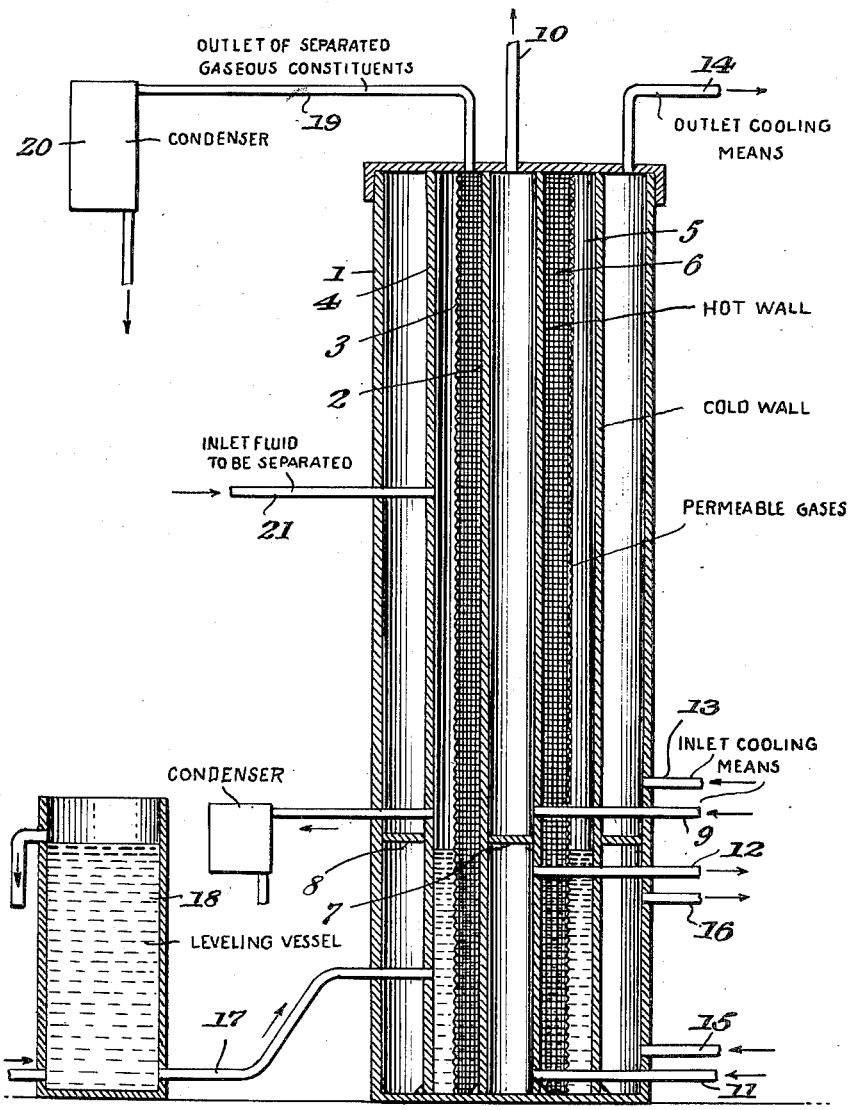

2,688,404

UNITED STATES PATENT OFFICE 2,688,404

THERMAL DIFFUSER SEPARATOR

Walter Wahl, Helsingfors, Sweden

Application March 1, 1949, Serial No. 79,064

Claims priority, application Sweden March 5, 1948

4 Claims. (Cl. 210—52.5)

The present invention refers to an arrangement, which is especially intended to be used in connection with the method of concentrating or separating the components contained in a gas mixture or a liquid mixture and of concentrating or separating isotopes, described in the patent application No. 789,914. The present arrangement relates especially for such a modification of said procedure, which is intended to be used in a system containing at the same time liquid and vapor.

The arrangement according to this invention is thus an improvement of the apparatus, described in said patent application No. 789,914. The present invention is, the same as the invention described in patent application No. 789,914, based on the arrangement of a permeable partition wall in a separator for fluid mixture i. e. in a thermodiffusion unit comprising hot and cold walls, the permeable wall being placed between the hot and the cold walls. The permeable wall is arranged to have such a porosity that it permits the best possible passage and thus an optimal thermodiffusion of different kinds of atoms, molecules and/or ions in the fluid which are to be separated without, however, giving simultaneously passage of such larger currents of fluid, which could cause a turbulent mixing up of the fluids on different sides of the porous separating wall.

The arrangement according to the present invention is characterized mainly in that the chilled as well as the heated walls, between which the partition wall is placed, are divided into two sections with different cooling—respectively heating arrangements, so that the upper portion of respectively the cooled and the heated walls can be kept at a higher temperature than the lower portion of the corresponding walls. The space between them is consequently also divided into an upper hotter department and a lower colder department. In case the heating and the cooling temperatures are chosen in such a way, that the lower part of the separator is kept at a temperature, which at the most is equal to the boiling-point of the mixture, while in the upper department of the apparatus the temperature is held above the boiling-point of the mixture. The separator will be working with liquid in its lower department and vapor in its upper department. By connecting the outlet at the upper end of the separator's hotter department to a cooling device it is possible to condensate the separated lighter fraction of the prepared fluid and either return this condensate to the lower end of the hotter department of the separator or to lead it to a new, similarly constructed separator for continued preparation such as enriching or separation.

The invention can be used in separating of liquid mixtures and also in separating of different isotopes, such as ordinary and heavy water and other mixtures.

The invention will now be described more in detail by aid of the accompanying drawing, which as an example diagrammatically illustrates one form of the arrangement, which is suitable for separating, for instance, mixtures of hydrocarbons, such as fractions of petrol and benzin and other organic substances, but also for separation of heavy water from ordinary water.

The figure shows diagrammatically a separator plant according to the invention in vertical section.

According to the figure the separator comprises a metal receptacle 1 of cylindrical shape. Within this cylinder three cylindrical and coaxial members 2, 3 and 4 are arranged. The inner tubular member 2 is adapted to form the separator's hot wall and the outer tubular member 4 is adapted to form the separator's cold member. The ring-formed space between them is adapted to confine the fluid to be separated. In this space the third permeable tubular member 3 is arranged. This tubular member thus divides the space between the walls 2 and 4 into two narrower layers 5 and 6.

At a certain height a transversal wall 7 divides the tube 2 into an upper and a lower department and in the same manner another transversal wall 8 divides the space between the outer cylindrical tube 4 and the receptacle wall 1 into an upper and lower department. The transversal walls 7 and 8 are on the same level.

The inner tube's upper department has an inlet 9 and outlet 10 through which a heating means such as steam, hot gas or the like is led into and passing said inner tube thereby maintaining its temperature at a predetermined high temperature.

In the same manner the inner tube's lower department has an inlet 11 and outlet 12 for heating means, which maintain the wall beneath the transversal wall 7 at a predetermined temperature lower than the temperature above the transversal wall 8.

The space between the outer cylindrical wall 4 and the receptacle's wall 1 has over as well as beneath the transversal wall 8 inlets 13 and 15 respectively and outlets 14 and 16 respectively for cooling means which cool the wall 4.

The fluid to be handled is introduced into the ring-formed space between the walls 2 and 4 by an inlet 17. This inlet comes from a levelling vessel 18, by aid of which the liquid fluid in the separator is maintained at the same level, i. e. on level with the transversal walls 7, 8. As a consequence of the different temperatures of the walls 2 and 4 a thermal diffusion of the fluid between them takes place through the permeable wall 3.

An electrical resistance may be used for creating the heat within the tube 2 necessary to maintain its wall at a temperature useful for the thermal diffusion.

The liquid fluid to be prepared is introduced at 17 from the levelling vessel 18. It rises in the tube 2 to a level which corresponds with the level in the levelling vessel i. e. with the levels of the transversal walls 7 and 8 and is automatically kept on this level. Then the heating means e. g. steam, smoke gas, or some organic fluid with high boiling temperatures is introduced into the tube 2 at 9 and 11. The heating means are of different temperatures in such a way that the lower part of the wall of tube 2 gets a lower temperature than its upper part. Simultaneously cooling means for instance water is introduced into the space between the wall 4 and the receptacle wall 1 through the inlets 13 and 15. The cooling means are also of different temperatures so that the upper part of the cooled wall 4 gets a somewhat higher temperature than its lower part, beneath the transversal wall 8.

The different temperatures of the parts of the cold and the warm wall have the effect that the temperature in the upper and lower departments of the ring-formed space between the walls 2 and 4 becomes different. The upper part gets a temperature which is above the boiling-point of the fluid to be separated, the lower part gets a temperature equal or lower than the boiling-point. Thereby the fluid in the upper part of the ring-formed chamber will be kept in gaseous state whilst the fluid in the lower part will remain in liquid form.

The different temperatures of the walls 2 and 4 cause a thermal diffusion and the lighter constituents of the fluid will flow to the warm wall whilst the heavier constituents will flow to the cold wall. The constituents pass hereby the permeable wall 3 which while preventing turbulences from arising represents the smallest possible obstacle for the mixture. The lighter fraction of the gas separated is withdrawn at the top of the separator at 19.

If the separated fraction needs further preparation the withdrawn gas may be led to a condenser 20 from which the condensate may either be led back to the separator and introduced at 21 or conducted to a second separator of similar construction for further continued separation.

The permeable partition wall 3 can be made of any suitable natural or synthetic permeable material which allows the gas or fluid molecules to pass freely but prevents more violent motion of larger coherent portions of the gas or fluid during separation. Metal gauze, or metal or alloy foil in which perforations have been made as small and as numerous as practicable, may be used. But the material must naturally be one that is not attacked or dissolved by the substance to be separated nor, in the case of solutions, by the solvent mixture; and for separations which need to be carried on at high temperatures, it must, of course, withstand that temperature. The material of the partition wall in the separator is not of importance provided it is suitable for the gas or fluid to be separated and complies with the requirement that free thermodiffusion of the components of the mixture is not to be hindered. So the choice of it depends mainly upon perfectly well known chemical properties (inertness with respect to the substances treated) and physical properties (as ability to withstand high temperature). The degree of permeability is not critical; it is plainly essential to avoid, on the one hand, selective diffusion by a porous mebrane, and, on the other hand, such free communication through the partition as will permit a turbulent stirring together of the contents of the chambers on the two sides of it. Between these extremes there is ample width of choice, and it is a matter of routine test to ascertain, for any particular process of separation, what is the cheapest and most efficient partition.

As an instance, enrichment in oxygen of the air supply to a metallurgical furnace by thermal diffusion could be improved as above explained by the use of one or more partitions made of metal gauze, e. g., of stainless steel, of 250 mesh to the inch. Where chemical inertness and some refractoriness are called for a partition of a mineral of pumiceous structure could be considered.

A further example of a partition wall 3 is a construction wherein two parallel metal gauze partitions are used having a 250 mesh which are spaced approximately 6 mm. apart with the space in between filled with glass spheres having a 2 mm. diameter.

In the form of construction illustrated by the drawing, the separator is given a circular cross section, but the invention is not necessarily so limited, since also a flat box form or other shapes can be used for forming the outlines for the separator.

I claim:

1. A thermal diffusor separator for separating a partly liquid, partly gaseous fluid solely by thermal diffusion comprising a receptacle having a hot and an opposite cold wall element defining a space for confining the fluid to be separated and having outlets and inlets for said fluid, means for maintaining said wall elements at different temperatures, a permeable separation wall dividing said space of such pore size as to prevent turbulent mixing of the fluid components arranged between and parallel to said wall elements, said means for maintaining said wall elements at different temperatures being divided into groups, two for the hot and two for the cold wall element, to maintain the upper part of the hot and the upper part of the cold wall warmer than their lower parts whereby said space is hotter at its upper part to separate the gaseous part of said fluid and is colder at its lower part to separate the liquid part of said fluid.

2. An apparatus according to claim 1 wherein said receptacle, wall elements and permeable wall are concentric tubular elements and said means for maintaining said wall elements at different temperatures are arranged within the inner tubular wall element and around the outer tubular wall element, said space between the cold and the hot wall being cylindrical for receiving the fluid to be separated.

3. An apparatus according to claim 2 wherein a transverse wall is provided within the inner tubular wall element for heating means and a second transverse wall is provided in the space outside and around the outer tubular cold wall element for cooling means, said transverse walls being arranged on the same level where the liquid and gaseous parts of the fluid to be separated abut each other.

4. An apparatus according to claim 3 wherein an inlet tube for the fluid to be separated is connected to a levelling vessel to keep the level of the liquid fluid in the lower part of the separator at a constant height.

References Cited in the file of this patent

UNITED STATES PATENTS

| Number | Name | Date |
|---|---|---|
| 2,124,861 | Saddington et al. | July 26, 1938 |
| 2,158,238 | Hvid | May 16, 1939 |
| 2,258,594 | Brewer et al. | Oct. 14, 1941 |
| 2,268,134 | Clusins | Dec. 30, 1941 |
| 2,521,112 | Beams | Sept. 5, 1950 |
| 2,585,244 | Hanson | Feb. 12, 1952 |

FOREIGN PATENTS

| Number | Country | Date |
|---|---|---|
| 266,396 | Great Britain | Feb. 23, 1927 |
| 733,079 | Germany | Mar. 18, 1943 |